United States Patent [19]
Wafford et al.

[11] Patent Number: 4,968,021
[45] Date of Patent: Nov. 6, 1990

[54] FABRIC TURNER

[75] Inventors: Lawrence Wafford, Mesquite; Richard L. Harrington, Farmersville; Hubert Blessing, Dallas, all of Tex.

[73] Assignee: Levi Strauss & Company, San Francisco, Calif.

[21] Appl. No.: 333,702

[22] Filed: Apr. 4, 1989

[51] Int. Cl.$^5$ ............................................. B65H 29/00
[52] U.S. Cl. ................................. 271/186; 198/374; 198/395; 198/399; 198/403; 271/304
[58] Field of Search ............... 198/374, 395, 399, 403, 198/410, 624; 271/186, 304

[56] References Cited

U.S. PATENT DOCUMENTS

| | | | |
|---|---|---|---|
| 2,754,953 | 7/1956 | Groncy | 198/624 |
| 4,078,789 | 3/1978 | Kittredge et al. | 271/186 |
| 4,346,880 | 8/1982 | Roller et al. | 271/186 |
| 4,359,217 | 11/1982 | Roller et al. | 271/186 |
| 4,673,176 | 6/1987 | Schenk | 271/186 |
| 4,699,367 | 10/1987 | Russel | 271/186 |
| 4,799,613 | 1/1989 | Adamson | 198/395 |

FOREIGN PATENT DOCUMENTS 2438811  2/1976  Fed. Rep. of Germany ...... 198/374
75392    5/1982  Japan ............................ 271/186

OTHER PUBLICATIONS

Xerox Disclosure Journal, vol. 6 #4 7/8'81, p. 179.

Primary Examiner—Joseph E. Valenza
Attorney, Agent, or Firm—Limbach, Limbach & Sutton

[57] ABSTRACT

An apparatus is disclosed for flipping over flexible and limp planar workpieces such as fabric. The apparatus includes a primary workpiece propeller having a cylindrical means for contacting the workpiece about a central rotating axis. A slot of sufficient size to receive the workpiece is positioned in a vertical orientation beneath the primary propeller. The slot preferably has a flared upper end positioned directly beneath and in contact or near contact with the propeller. The fabric is drawn into the slot by the rotation of the propeller and follows the contour of the flared open end of the slot. The fabric enters into the slot until the trailing edge of the fabric is in contact with the primary propeller. The trailing edge of the fabric is gripped by the propeller and thereby drawn to the opposite side of the flared opening of the slot and is subsequently pulled out of the slot. The fabric has thereby been inverted so that the top of the fabric is now on the bottom.

11 Claims, 20 Drawing Sheets

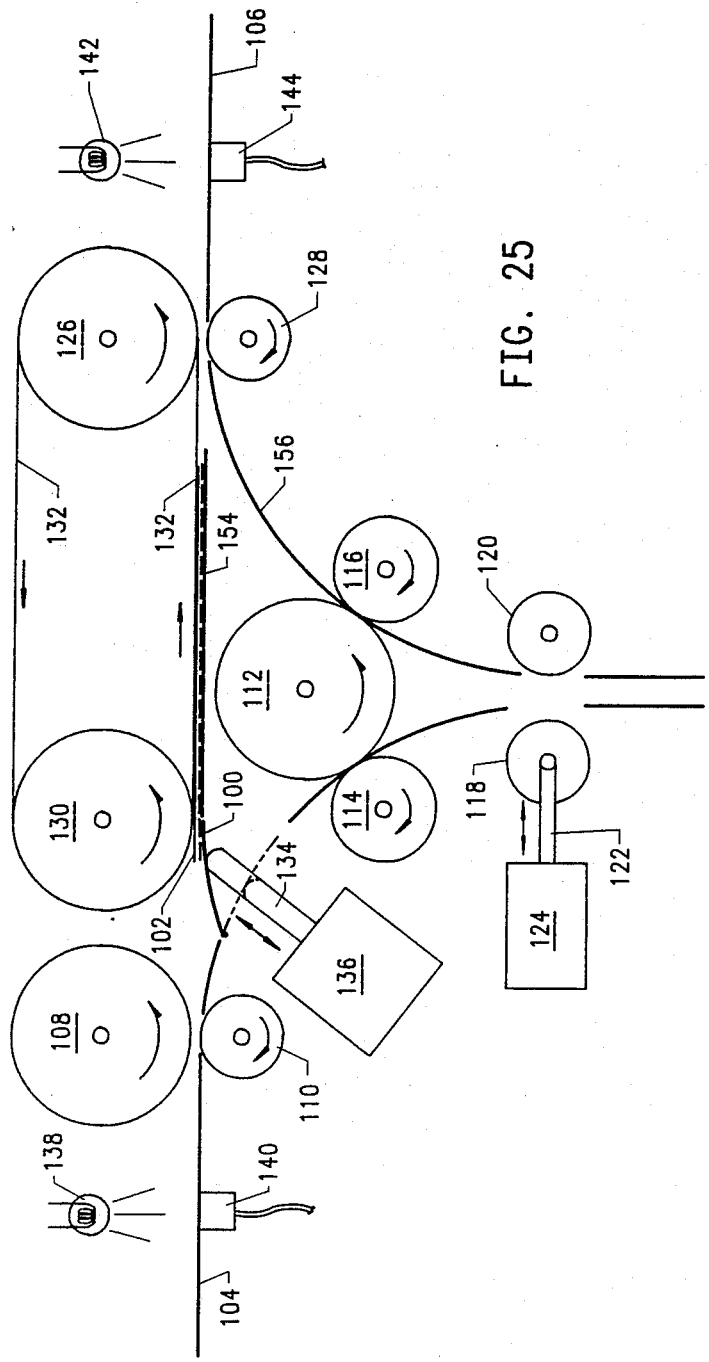

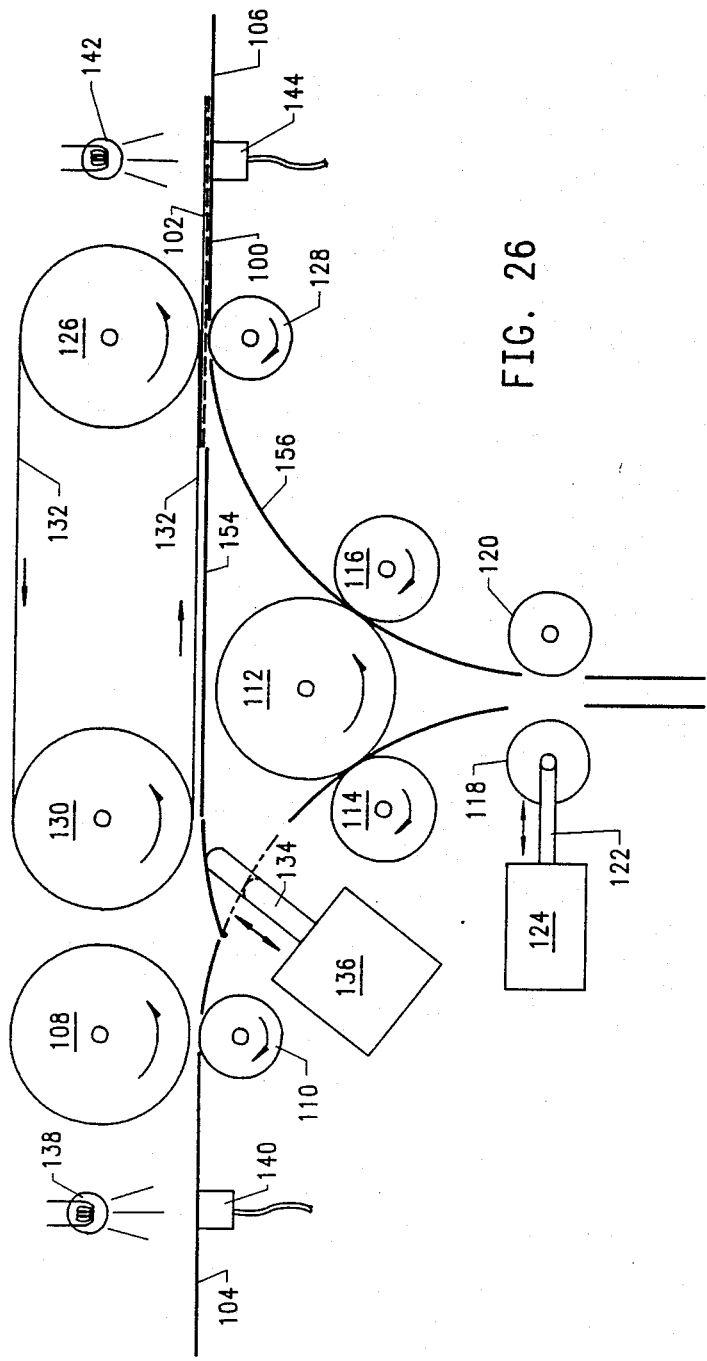

FABRIC TURNER

FIELD OF THE INVENTION

This invention relates to the field of automated handling of flexible limp planar objects. More particularly, this invention relates to the field of automated fabric handlers with the specific purpose of turning a piece of fabric over so that the top side is down and vice versa.

BACKGROUND OF THE INVENTION

In the field of automated material handling, the handling of rigid and semi-rigid objects is understood and utilizes machinery to push, pull, grab or flip such objects. Flexible and limp objects, such as pieces of fabric, pose particularly onerous problems in the field of automated handling. Such objects may only be pulled. An attempt to push such an object will generally result in the object bunching up, folding over itself and ultimately jamming the flow of the workpiece.

SUMMARY OF THE INVENTION

An apparatus is disclosed for flipping over flexible and limp planar workpieces such as fabric. The apparatus includes a primary workpiece propeller having a cylindrical means for contacting the workpiece about a central rotating axis. A slot of sufficient size to receive the ,workpiece is positioned in a vertical orientation beneath the primary propeller. The slot preferably has a flared upper end positioned directly beneath and in contact or near contact with the propeller. The fabric is drawn into the slot by the rotation of the propeller and follows the contour of the flared open end of the slot. The fabric enters into the slot until the trailing edge of the fabric is in contact with the primary propeller. The trailing edge of the fabric is gripped by the propeller and thereby drawn to the opposite side of the flared opening of the slot and is subsequently pulled out of the slot. The fabric has thereby been inverted so that the top surface of the fabric is now on the bottom.

BRIEF DESCRIPTION OF THE DRAWINGS

FIGS. 14 through 26 show cross-sections of a fifth alternate embodiment of the present invention through the various cycles of its operation.

DETAILED DESCRIPTION OF THE PREFERRED EMBODIMENT

Figure 1:
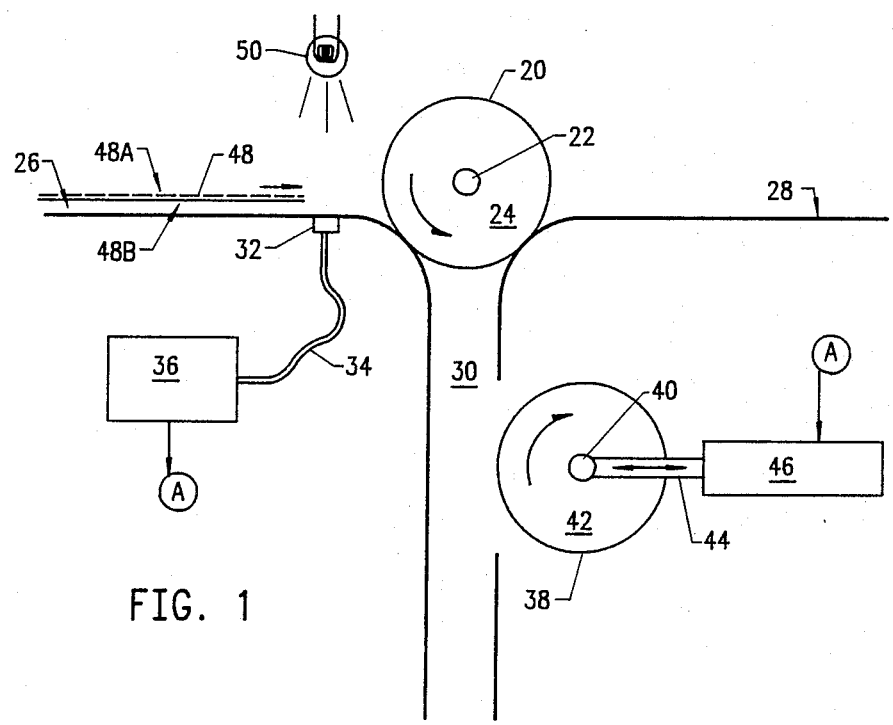
FIGS. 1 through 8 show a cross-section of the preferred embodiment of the present invention through the various cycles of its operation.

FIG. 1 shows in cross-section the major components of the apparatus of the preferred embodiment of the present invention. The primary propeller 20 consists of a central rotating shaft 22 on which is positioned a cylindrical rotating means for propelling a fabric workpiece. The rotating means 24 is preferably an annular brush or roller or a series of annular brushes or rollers positioned along the central axis 22 for engaging a piece of fabric 48.

The propeller 20 is positioned to come into contact or nearly in contact with the input tray 26. The input tray 26 may be formed of sheet metal or another planar surface along which the fabric 48 slides or is drawn by any convenient means prior to engaging the propeller 20. The output tray 28 is of similar construction to the input tray. Where the propeller 20 engages the input tray 26 and the output tray 28, the two trays each bend downward in a flared arcuate curve and terminate at the top of the appropriate respective wall of the slot 30. The slot 30 is formed between the two sheet metal portions. The slot 30 thus flares outwardly near its upper end where it contacts the propeller 20.

Positioned in the input tray 26 in close proximity to the propeller 20 is a fabric sensing device 32. The fabric sensing device is preferably a light sensor such as a photo sensitive diode. The fabric sensor 32 is coupled to an electronic control circuit 36 through wires 34.

A secondary propeller 38 is positioned along one side of the slot 30. When engaged with the fabric 48 the propeller 38 propels the fabric 48 upward. The propeller 38 includes a slideably mounted axle 40 around which is connected a brush or roller 42 similar to that for the primary propeller 24. The axle 40 is coupled at either end to a slideably controlled piston 44. The piston 44 is coupled to the air cylinder 46. The air cylinder 46 is controlled by the control signal A as shown.

In FIG. 1, a piece of fabric 48 is shown to be positioned on the input tray 26 and moving to the right. The top 48A of the fabric 48 is shown by a dotted line and the bottom 48B of the fabric 48 by a solid line. The movement to the right shown by the arrow may be generated by any convenient means. For example, there may be a conveyor belt or a propeller brush positioned over and contacting the input tray 26 pulling the fabric 48 toward the primary propeller 20. Light source 50, any commercially available light, is shown positioned over photo sensor 32. The control circuitry 36 receives a signal from the photo sensor 32 indicating that light is being received by photo sensor 32.

Figure 2:
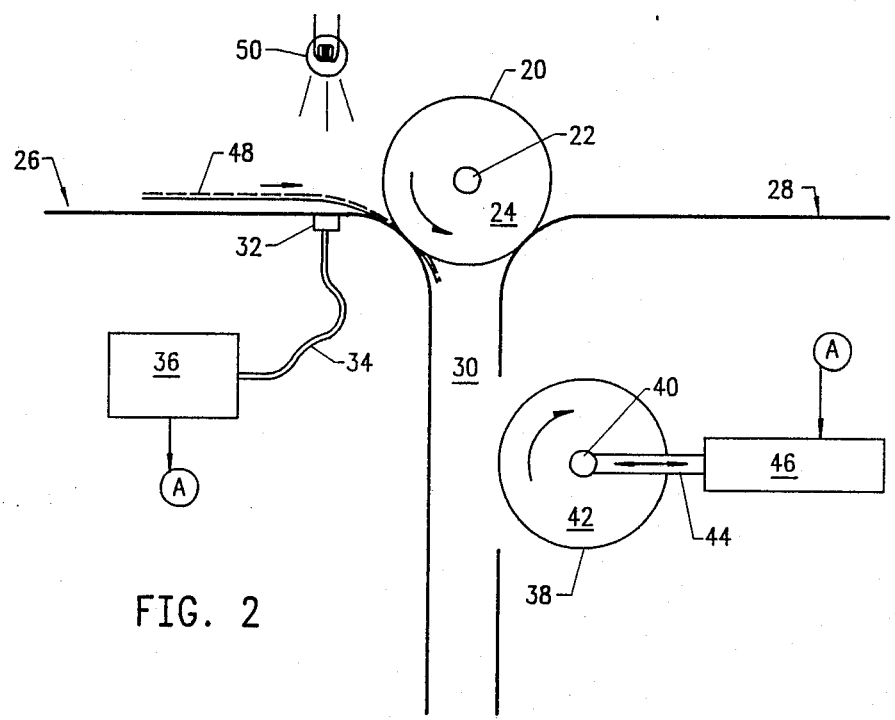

In FIG. 2, the fabric 48 is engaged by the primary propeller 20 and drawn into the slot 30. The fabric 48 also covers the light sensor 32. By covering the light sensor 32, the light from the light source 50 is prevented from reaching the photo sensor 32. The control circuit 36 is thus conditioned to indicate that a piece of fabric is covering the photo sensor 32.

Figure 3:
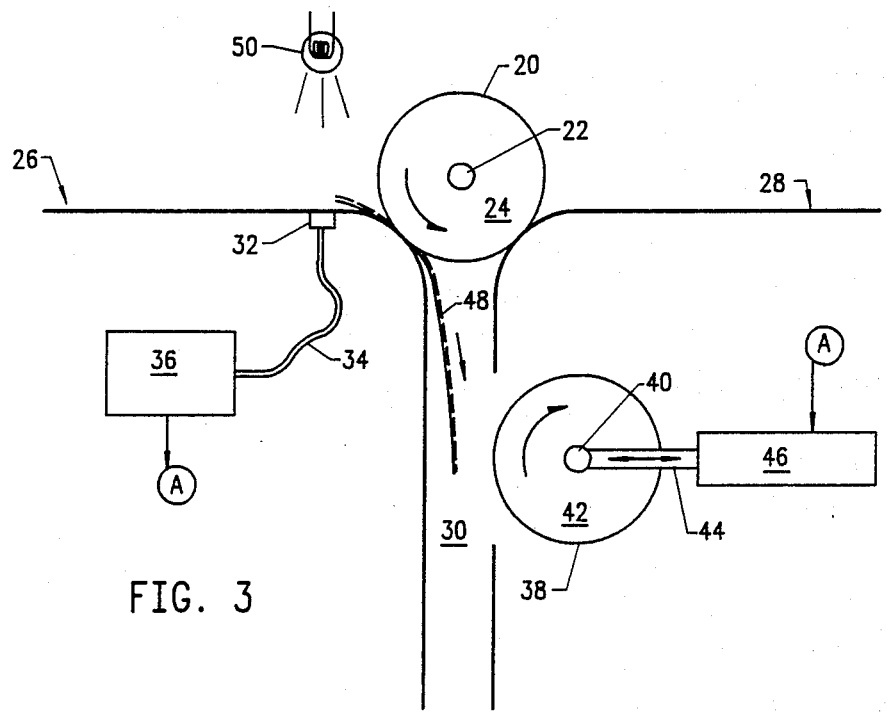

Referring to FIG. 3, the piece of fabric 48 passes beyond the photo sensor 32. The propeller 20 continues to draw the fabric 48 off of the input tray 26 and into the slot 30. The fabric 48 has passed beyond the photo sensor 32 allowing the light from light source 50 to once again reach the photo sensor 32. Upon receiving indication that light is once more being received from photo sensor 32 the control circuit 36, issues a signal A to control the air cylinder 46. The air cylinder 46 drives the piston 44 out of the air cylinder mechanism 46.

Figure 4:
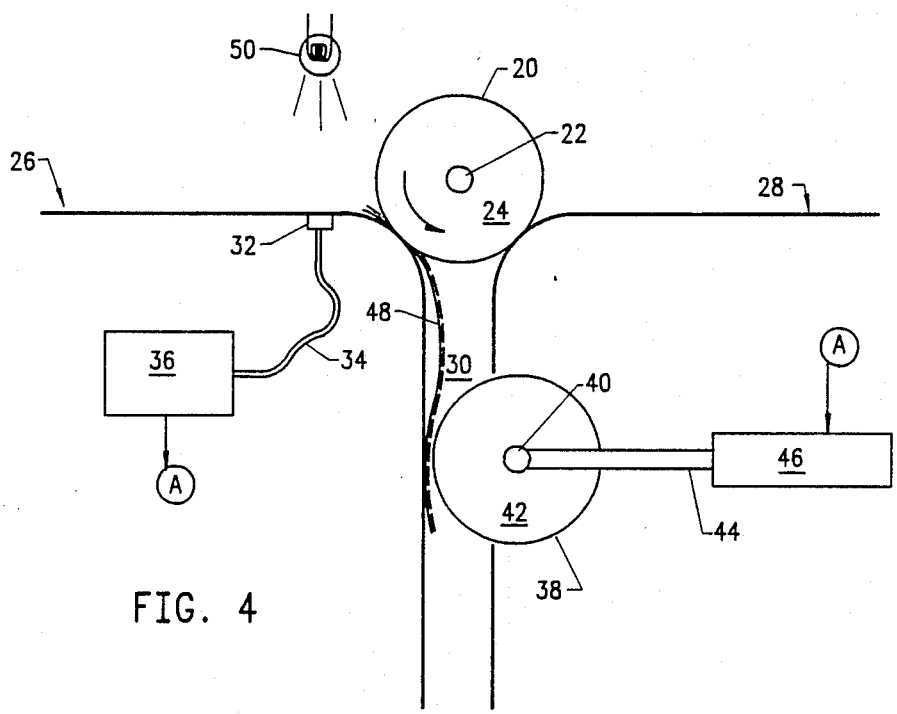

FIG. 4 shows that the motion of the piston 44 extends the secondary propeller 38 through an opening in one wall of the slot 30 and brings the secondary propeller 38 into contact with the fabric 48 pressing the fabric 48 between the opposite wall of the slot 30 and the secondary propeller 38. This friction contact of the fabric between the secondary propeller 38 and the opposite wall of the slot 30 stops the downward motion of the fabric 48.

Figure 5:
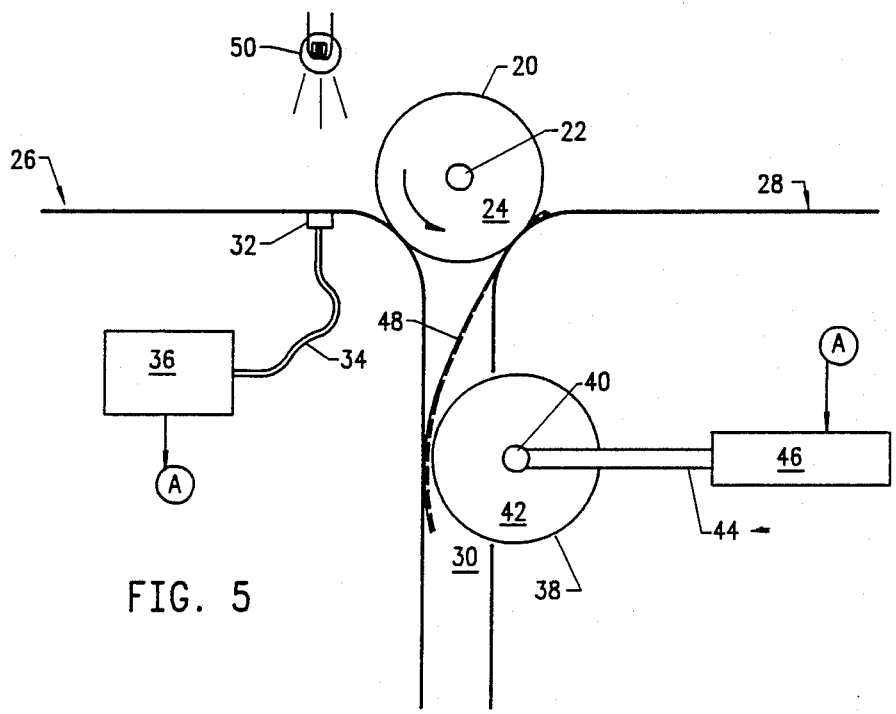

In FIG. 5, the trailing end of the upper face 48A of the fabric 48 is still in contact with the primary propeller 20. The primary propeller 20 causes the trailing end of the fabric 48 to flip from the input tray 26 and come into contact with the output tray 28. The rotation of the secondary propeller 38 prevents the fabric 48 from falling beyond the grasp and control of the primary propeller 20.

Figure 6:
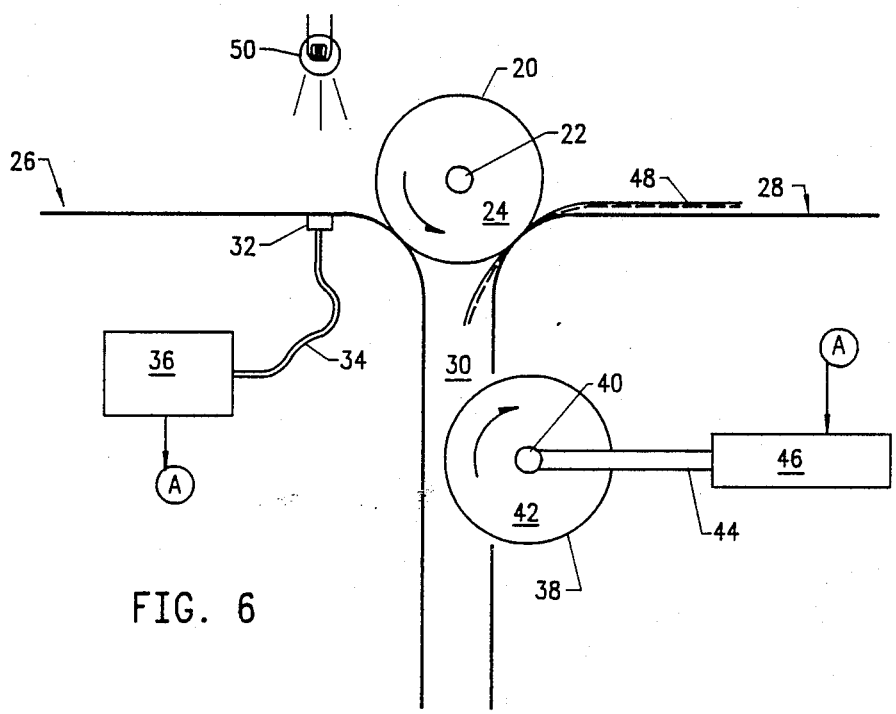

The secondary propeller 38 need not be rotating at the time it contacts the fabric. In some applications, a workpiece may bunch up if the secondary propeller 28 drives the workpiece upward before the primary propeller 24 engages the fabric to draw it out of the slot 30. The rotation of the secondary propeller can be activated in response to the trailing edge of the fabric being prepared to exit the slot 30 to avoid this. FIG. 6 shows the primary propeller 20 and the secondary propeller 38 propelling the fabric 48, pulling it out of the slot 30 onto the exit tray 28.

Figure 7:
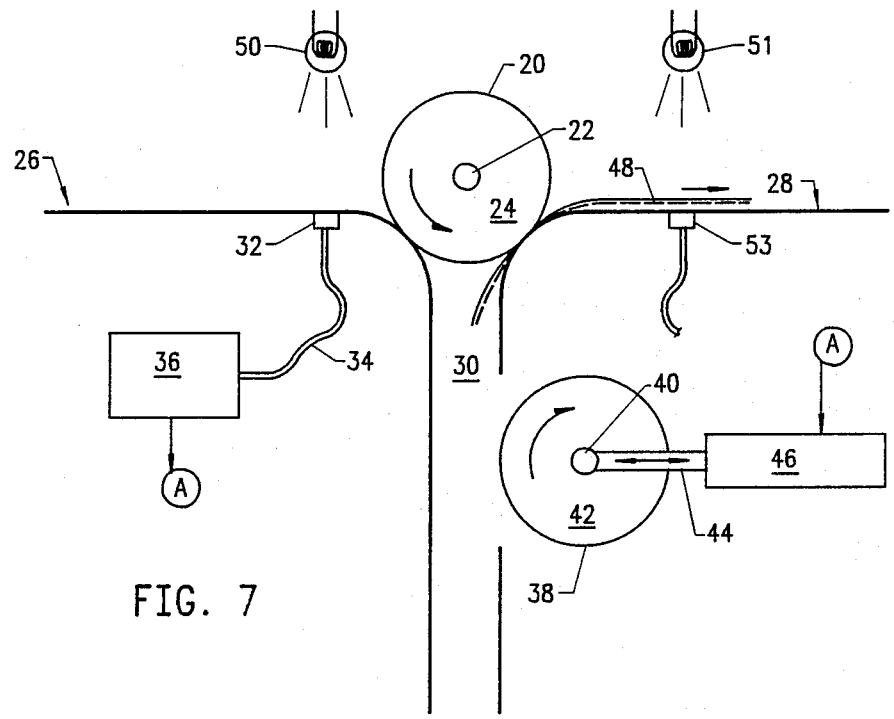

FIG. 7 shows that after the fabric 48 has left contact with the secondary propeller 38, the primary propeller 20 continues to pull the fabric 48. In some applications, a light 51 and photosensor 53 can be positioned in the exit tray 28 to sense when the fabric has left the apparatus. This sensor can be coupled to control the turning of the primary propeller 24 and secondary propeller 38. The progress of the workpiece can be stopped until the workpiece is required downstream.

Figure 8:
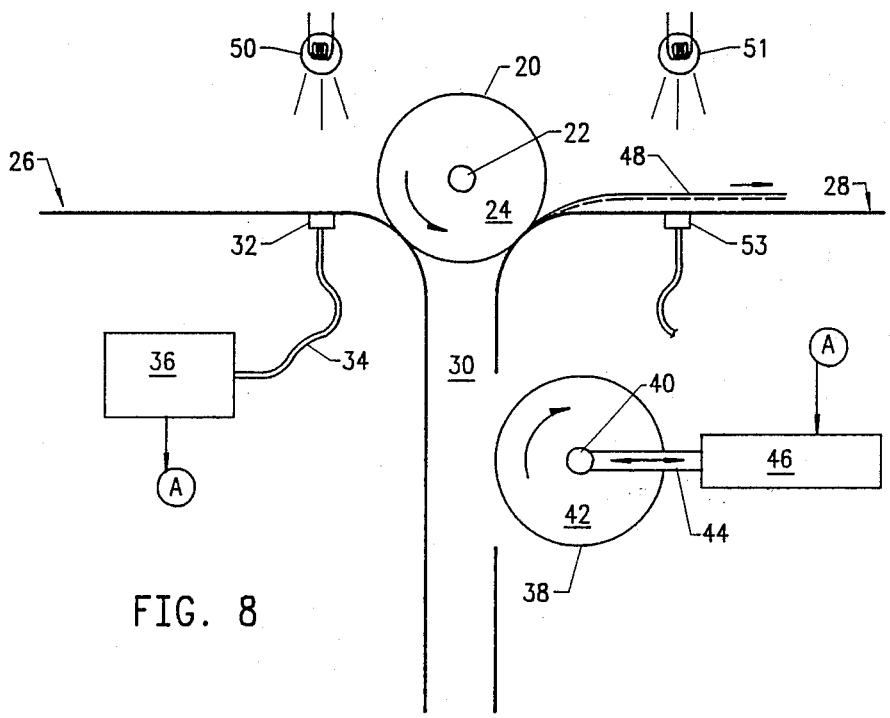

FIG. 8 shows that the fabric 48 has left contact with the primary propeller 20 to be removed from the exit tray 28 by any convenient means.

Figure 9:
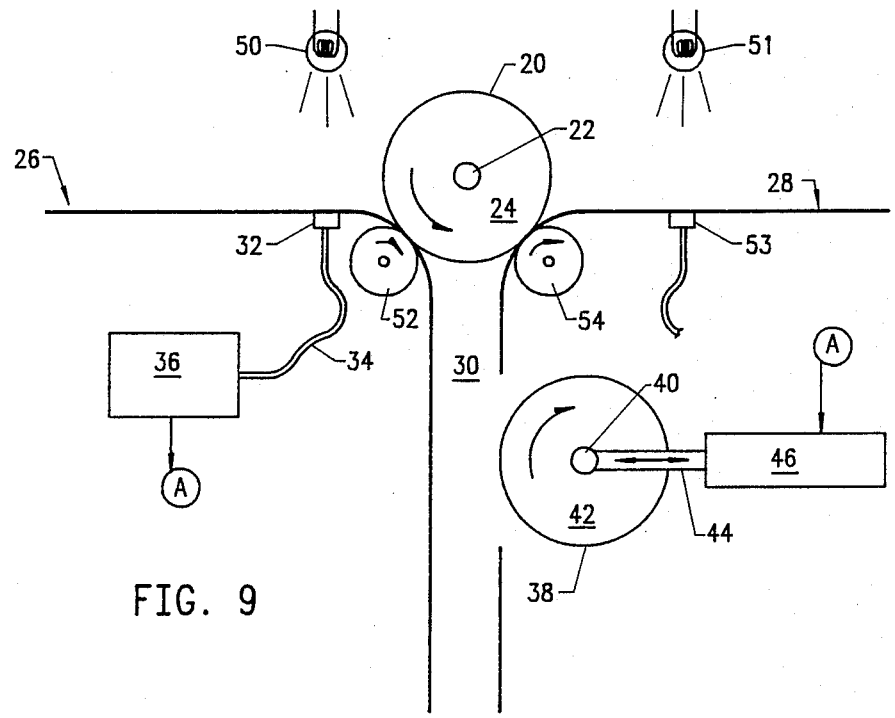
FIG. 9 shows a cross-section view of a first alternate embodiment of the present invention.

FIG. 9 shows a first alternate embodiment of the present invention. Rollers B and C are positioned in the arcuate curvatures formed between the input and output trays 26 and 28 and the slot 30. These rollers 52 and 54 may be free-rolling and turned by the fabric 48 moving across their surfaces. The rollers 52 and 54 may also be driven, for example, by a motor to enhance the moveability of the fabric into and out of slot 30.

Figure 10:
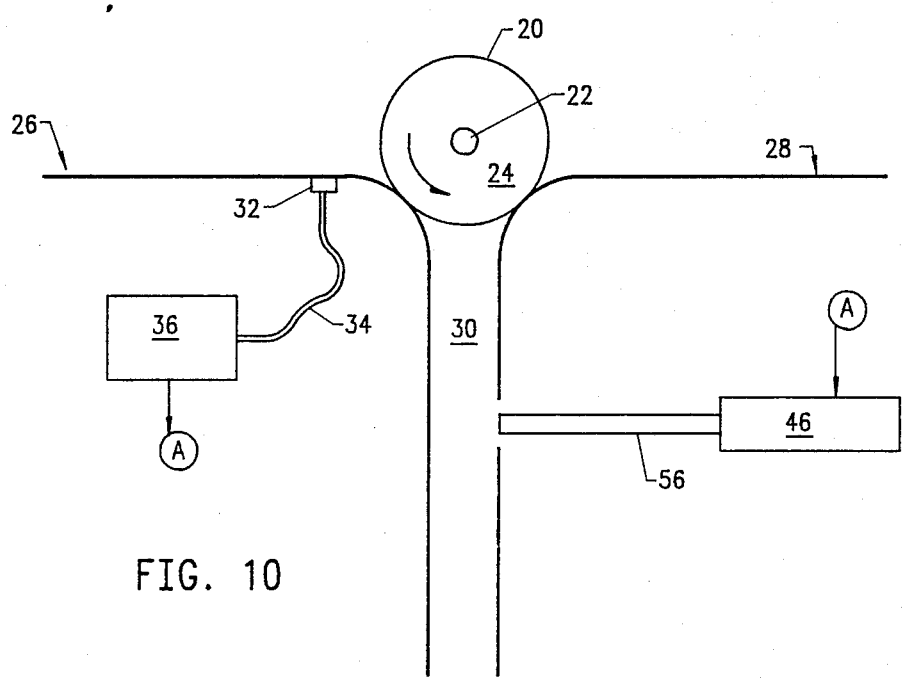
FIG. 10 shows a cross-section view of a second alternate embodiment of the present invention.

Certain circumstances do not require a secondary propeller 38. In such circumstances, some means are needed to stop the fabric. For example, in FIG. 10, an air cylinder piston 56 is shown to come in contact with the fabric and holding it in place against a wall of the slot with sufficient friction thereby allowing the primary roller to flip over and remove the fabric. This embodiment may be limited to certain configurations of fabric size and flexibility. The advantage of the light sensor 32 is that fabric of any length may be flipped over utilizing the present invention.

Figure 11:
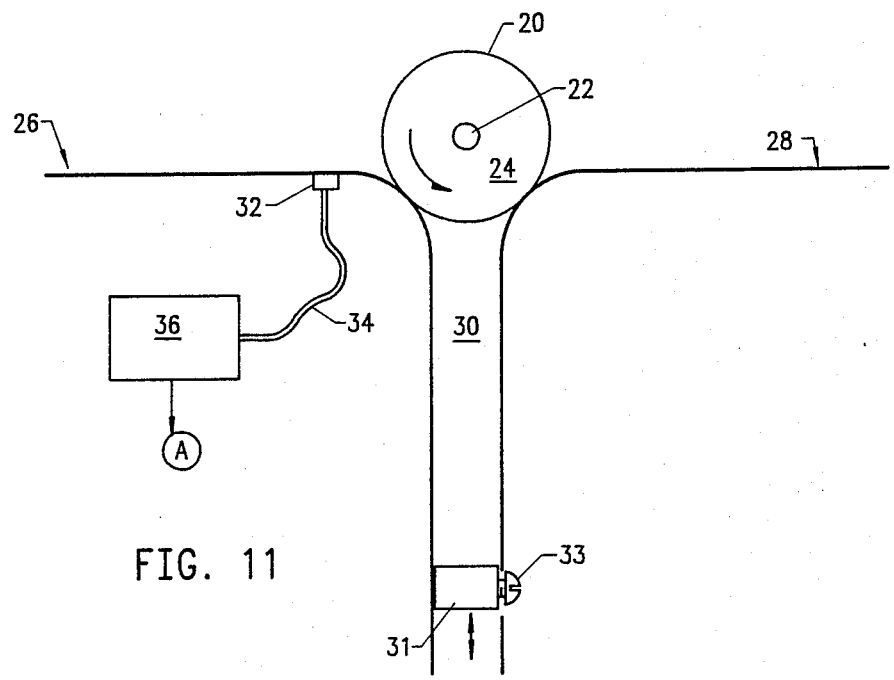
FIG. 11 shows a cross-section view of a third alternate embodiment of the present invention.

However, if only one size of fabric is to be flipped utilizing a specific apparatus built using the present invention, a bottom stop 31 may be put at an appropriate position in the slot to prevent the fabric from disengaging the primary propeller as shown in FIG. 11. The bottom stop 31 may be adjusted, for example, by a screw 33 positioned in a channel in a side wall of slot 30 as appropriate of the workpiece.

Figure 12A:
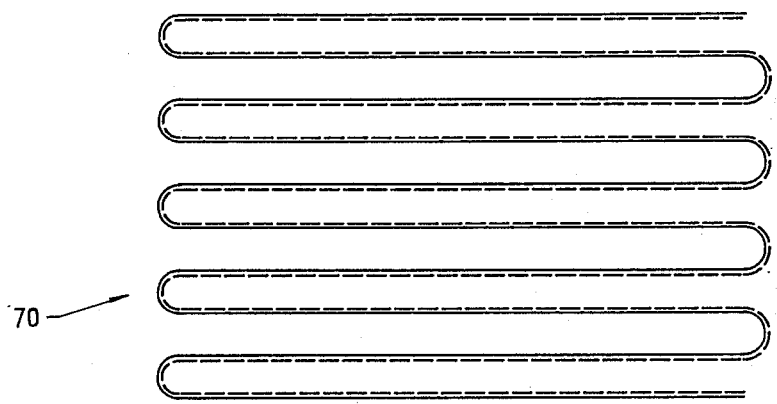
FIGS. 12 and 12a show cross-section views of possible workpieces utilized in connection with the present invention.
Figure 12B:
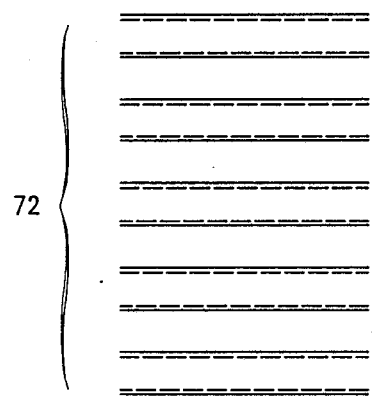

In other applications, not every object should be flipped. For example, in the garment industry, a bolt of fabric may be folded into a large accordion pleat 70 as shown in FIG. 12A. Ordinarily, such fabric has an outside and an inside. After forming the pleat 70, a single cut is made to form a stack of objects 72 as shown in FIG. 12B. The objects in the stack 72 are alternately face up and face down. Prior to further processing, it is desirable to turn every other piece of fabric over so that each piece is oriented face up or face down. It is also desireable that all the workpieces traverse the same path.

Figure 13:
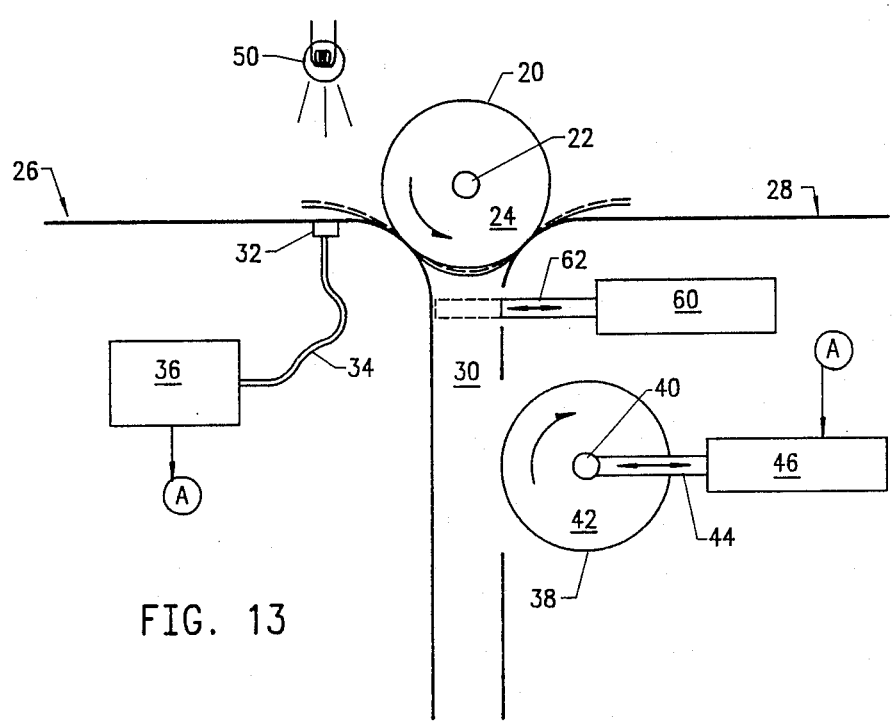
FIG. 13 shows a cross-section view of a fourth alternate embodiment of the present invention.

These goals are accomplished in the present invention with air cylinder 60 as shown in FIG. 13. The shaft 62 of air cylinder 60 is extended across the top of the slot 30. The shaft 62 may have a plate or grate couple to its distal end in order to more fully block the slot 30. A workpiece delivered to the apparatus after the air cylinder 60 is activated will be prevented from entering the slot 30. Instead, the workpiece will be drawn through the apparatus by the brush or roller 24 with its top to bottom orientation unchanged.

Figure 14:
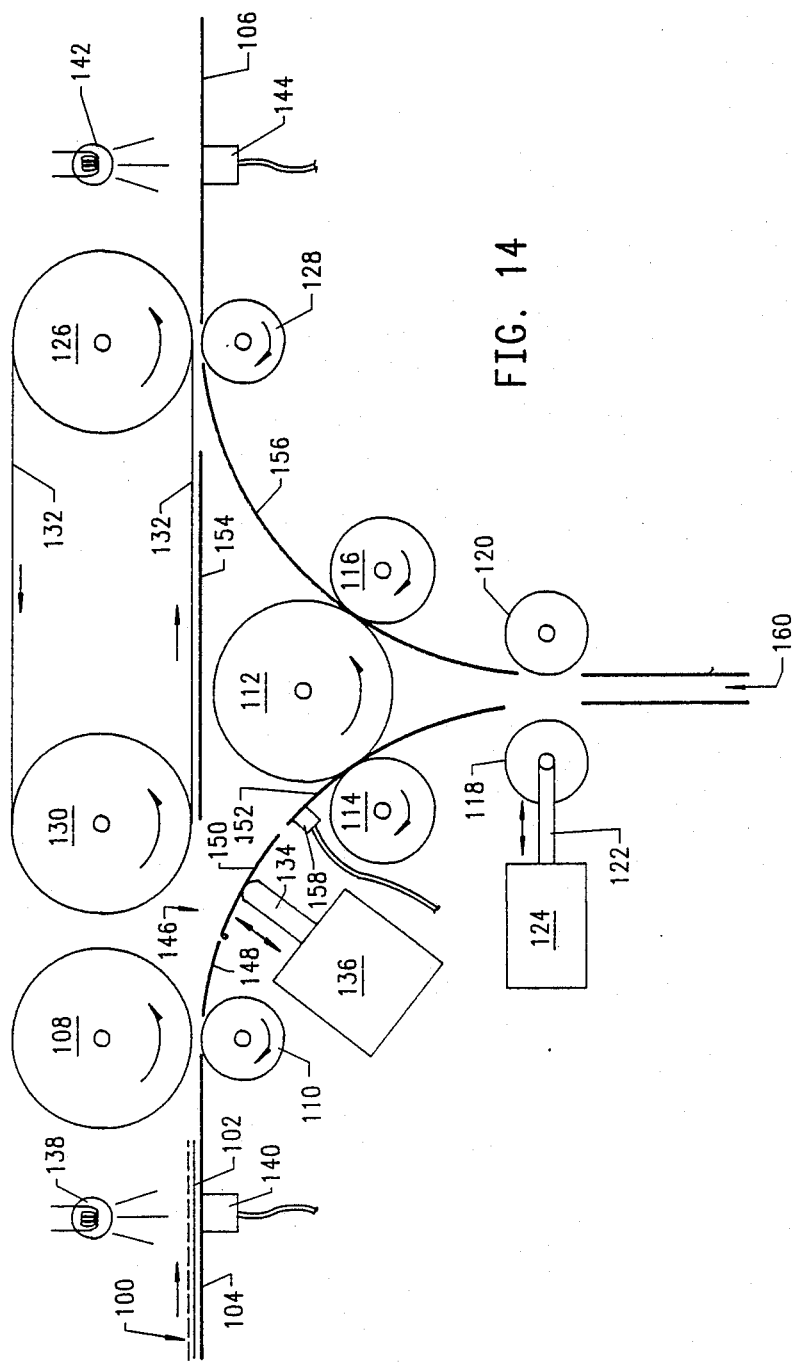

FIG. 14 shows a cross-section of a fifth alternate embodiment of the present invention. The apparatus comprises an input tray 104. The input tray is coupled to receive a workpiece and provide it into the apparatus. A coacting pair of brushes or rollers 108 and 110 is positioned, at the end of the input tray 104. Opposite the input tray 104 is an input arc member 146.

Arc member 146 comprises three sections, fixed arc 148, gate arc 150 and fixed arc 152. When the gate arc 150 is in the flip position as shown in FIG. 14, these three arc segments form a continuous curve. Coacting brushes or rollers 112 and 114 are positioned through an opening in fixed arc 152. The slot 160 is positioned directly below the roller or brush 112. Coacting rollers and brushes 118 and 120 are positioned near the top of slot 160. Brush 118 is coupled to pin 122 of air cylinder 124. In this manner, brush or roller 118 can be extended to contact brush or roller 120. Arc member 156 extends from the slot 160 away from arc 146. Arc 146, arc 156 and the walls of slot 160 form a shape somewhat similar to a Y.

Coacting brushes 112 and 116 are positioned through an opening in arc 156. Coacting brushes 126 and 128 are positioned at the upper end of arc 156. Upper tray 106 is positioned opposite arc 156 across the coacting brushes 126 and 128. Horizontal tray 154 extends substantially across the top of the Y formed by arc 146, 156 and the walls of the slot 160 between the coacting brushes 108 and 110 to the coacting brushes 126 and 128.

Figure 23:
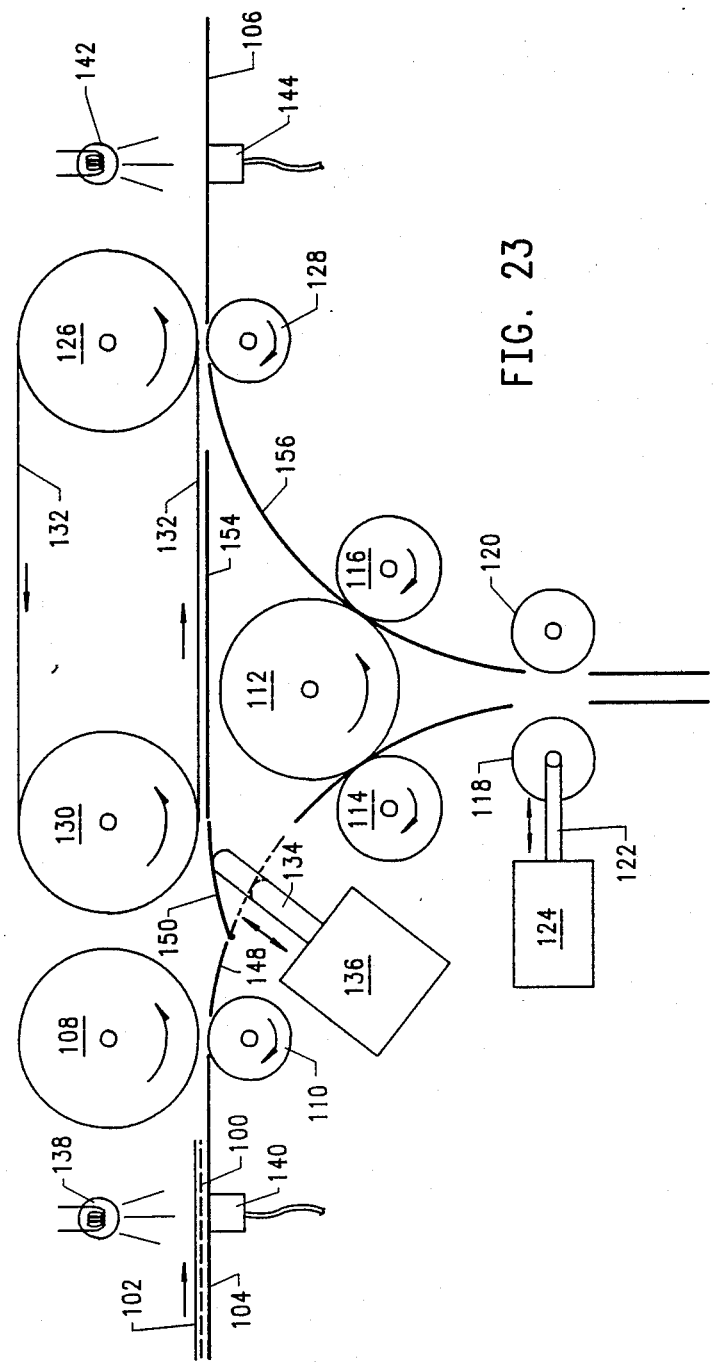

There is a gap between tray 154 and the coacting brushes 108 and 110 which gate 150 bridges as shown in FIG. 23 during non-flip mode. Brush 130 is positioned at the opposite end of horizontal tray 154 from brush 126. Brushes 130 and 126 are coupled with belt 132. Accordingly, brushes 126 and 130 rotate uniformly.

Light source 138 is positioned over input tray 104 to eliminate photosensor 140 located within input tray 104. Similarly, in the output tray is light source 142 and photo cell 144. Positioned in fixed arc 152 is photo cell 158, which is illuminated by a light source not shown. The three light sources 142, 138 and the one not shown may in fact be a single light source.

FIGS. 14 through 22 show the sequence of events which occur to flip a piece of fabric or other workpiece over within the apparatus of the fifth alternate embodiment of the present invention. FIG. 14 shows a piece of fabric of a top surface 100 and bottom surface 102 moving to the right along input tray 104. The piece of fabric is covering photosensor 140, thereby preventing the light from striking it. Input tray 104 can be, for example, a conveyor or other means for causing the fabric to traverse into the machine.

Figure 15:
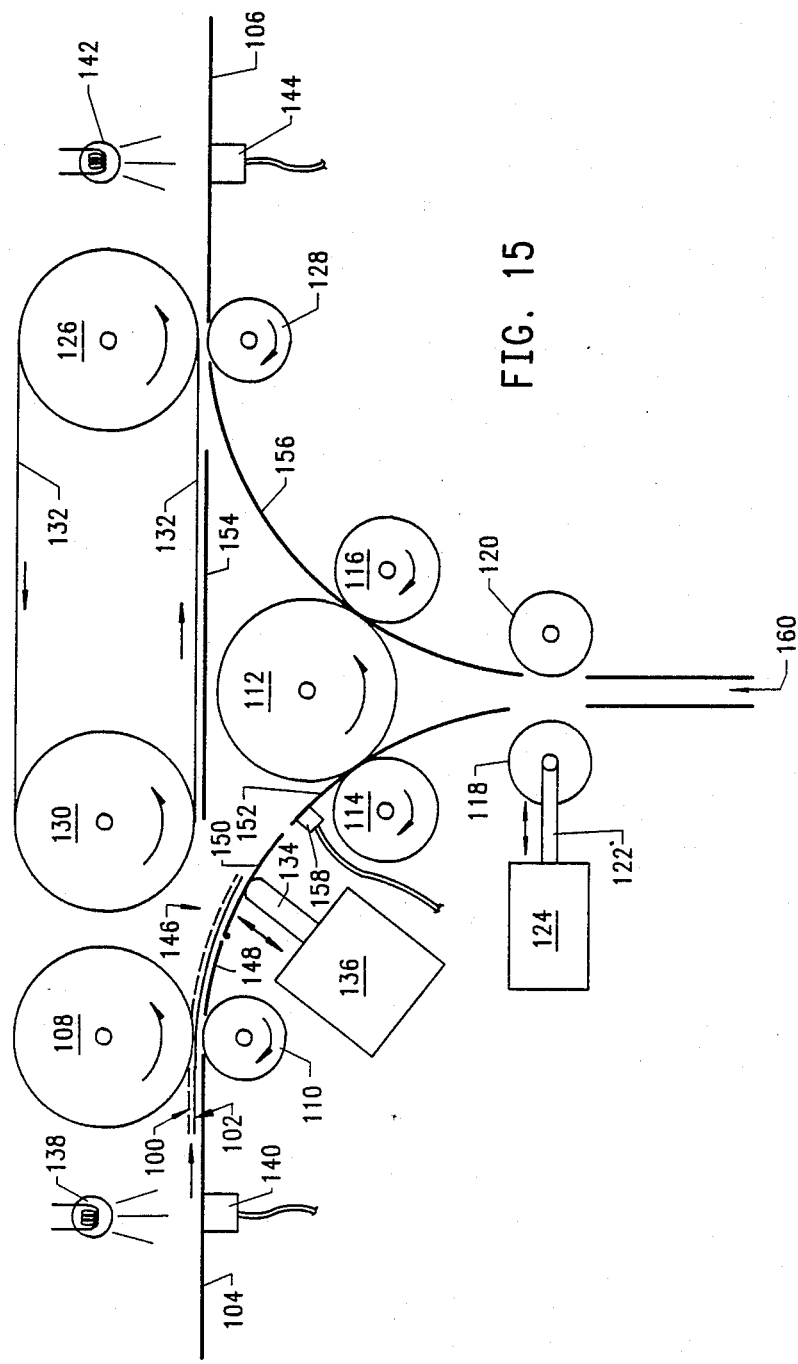

FIG. 15 shows that the fabric has been gripped by the coacting rollers 108 and 110. In FIG. 15, the roller 108 is rotating in a counterclockwise direction and roller 110 is rotating in a clockwise direction. The two rollers actually touch, thereby gripping the fabric and propelling it into the apparatus. Due to the force of gravity, the piece of fabric will follow the input arc 146 downward.

Figure 16:
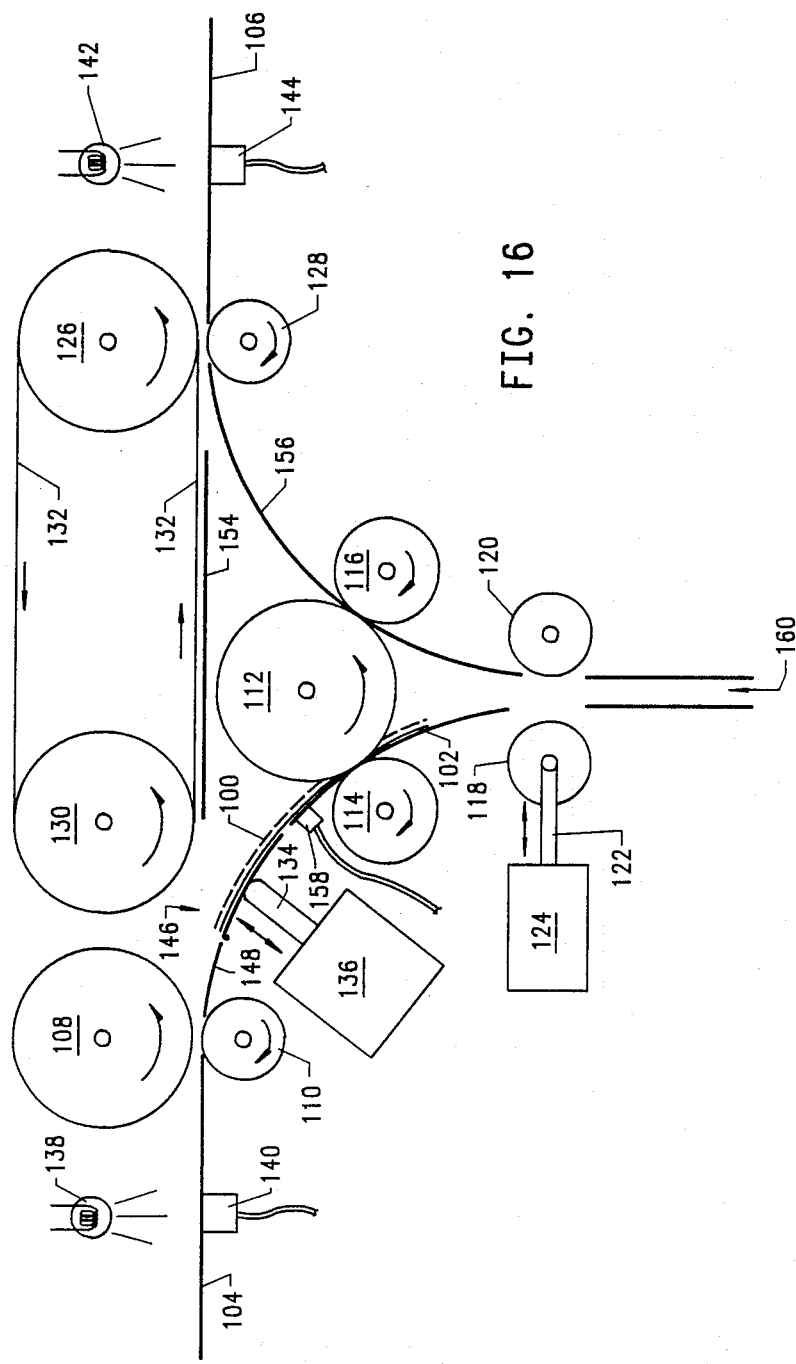

FIG. 16 shows that the piece of fabric has been gripped by the coacting rollers 112 and 114. Roller 112 is shown to rotate in a counterclockwise direction and roller 114 is shown to rotate in a clockwise direction. The coacting rollers 112 and 114 touch and thereby pull and propel the fabric downward into the slot 160. The piece of fabric blocks the light to the photo cell 158.

Figure 17:
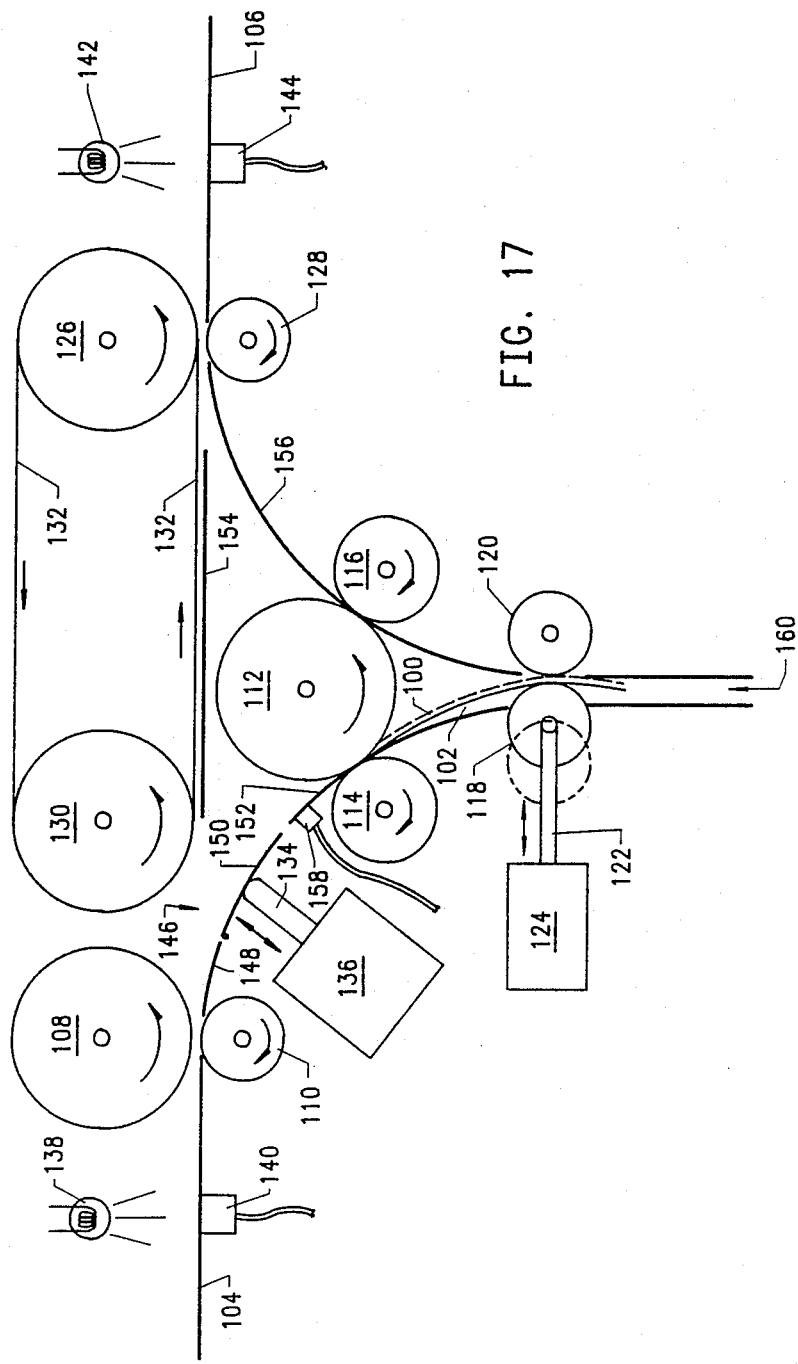

FIG. 17 shows that the piece of fabric has passed beyond the photo cell 158 allowing light to strike the photosensor. This causes the air cylinder 124 to extend its pin 122 pushing roller 118 into contact with roller 120. At this point in the operation, neither roller 118 nor roller 120 are rotating. By touching together, rollers 118 and 120 pinch the fabric stopping its downward motion in the slot 160.

Figure 18:
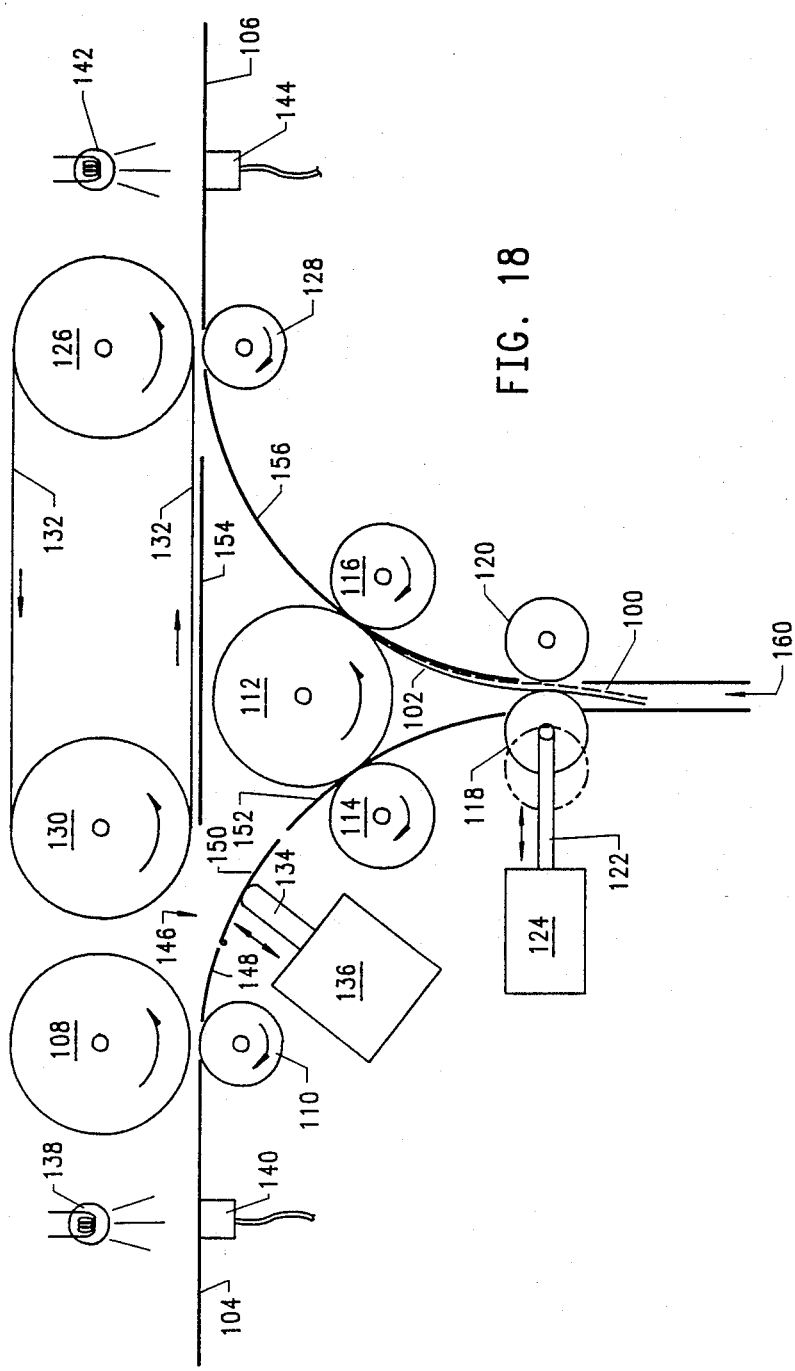

FIG. 18 shows that the trailing end of the workpiece has flipped due to the rotational direction of roller 112 from input arc 152 to exit arc 160. What was the trailing end of the workpiece is now the leading end of the workpiece and is positioned between the coacting rollers 112 and 116.

Figure 19:
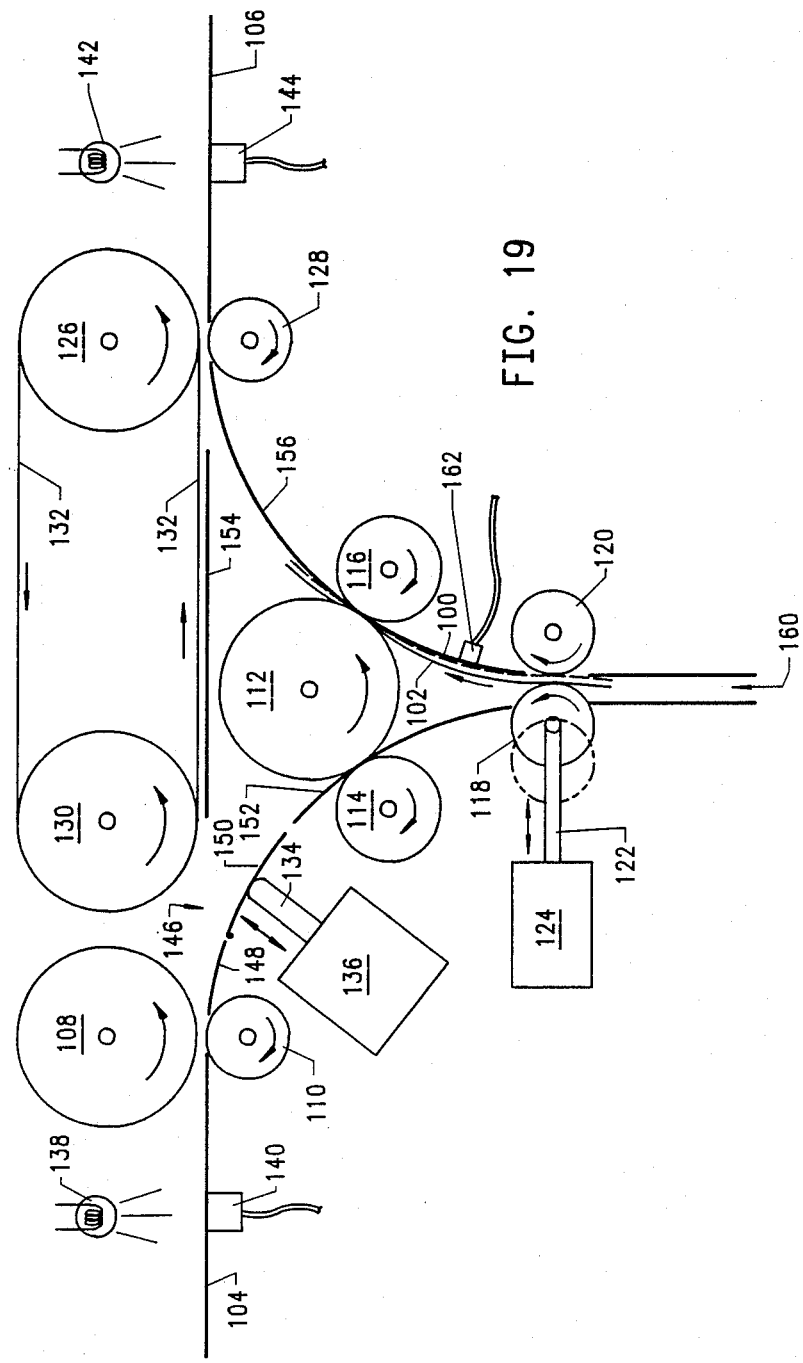

FIG. 19 shows that the coacting rollers 118 and 120 have begun to rotate. Roller 118 is rotating in a counterclockwise direction and roller 120 is rotating in a clockwise direction as shown. Coacting rollers 112 and 116 continue to rotate counterclockwise and clockwise directions, respectively. The combination of the rotation of these four rollers 112, 116, 118 and 120 acts to pull the fabric out of the slot 160. At this point in the sequence, the top surface 100 of the fabric workpiece is against the exist arc 156. The fabric is blocking light from impinging on the photosensor 162.

Figure 20:
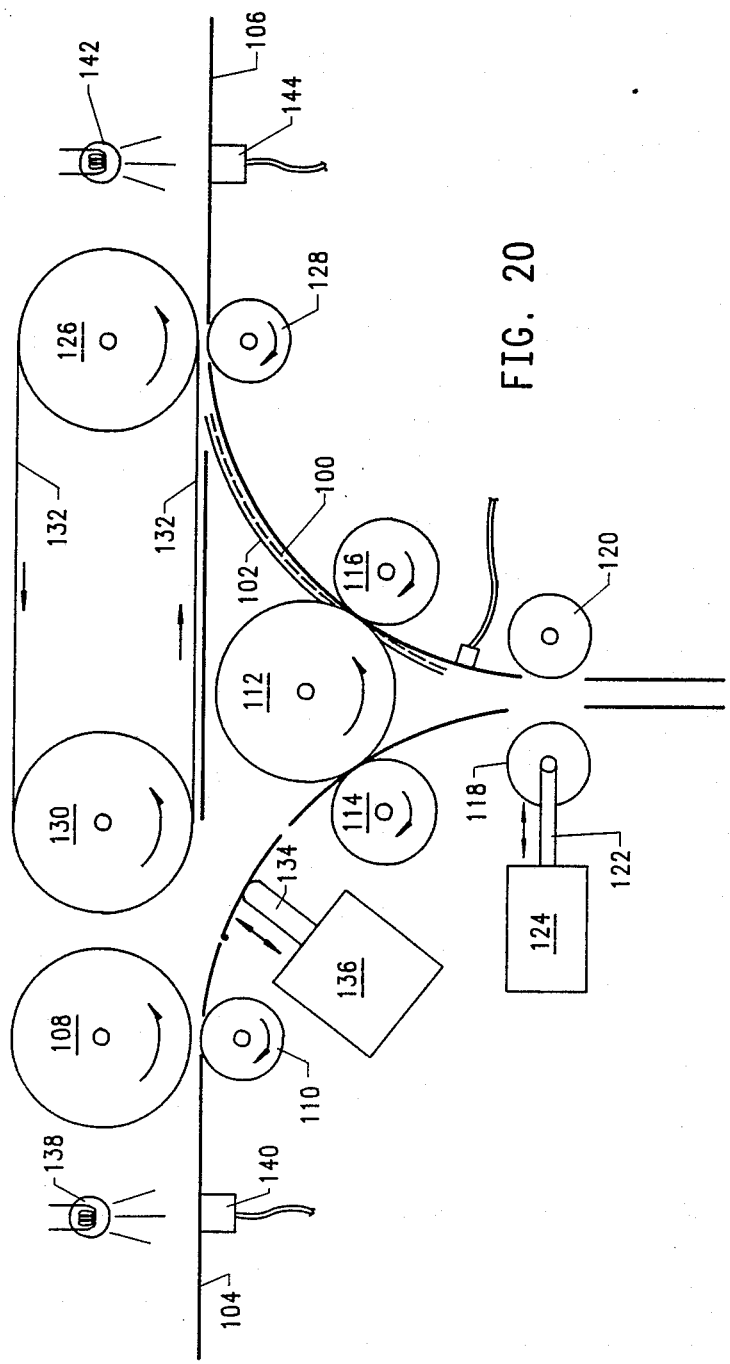

In FIG. 20, the fabric has passed beyond photosensor 162. In response, correcting rollers 118 and 120 stop rotating. Further, the air cylinder 124 and pin 122 retract roller 118 in preparation for receiving the next workpiece.

Figure 21:
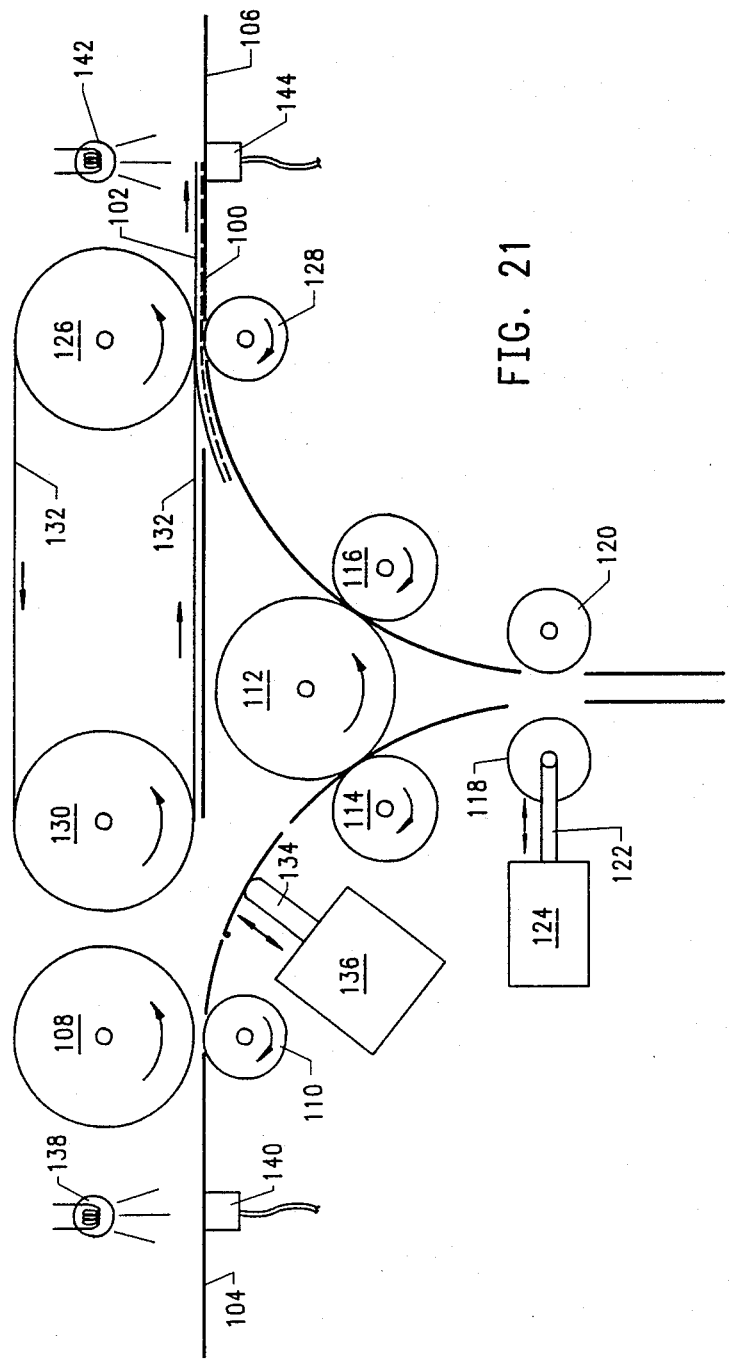

FIG. 21 shows that coacting rollers 126 and 128 rotating in counterclockwise and clockwise directions, respectively, thereby operating to draw the workpiece out of the apparatus onto the output tray 106. The output tray 106 can be a conveyor.

Figure 22:
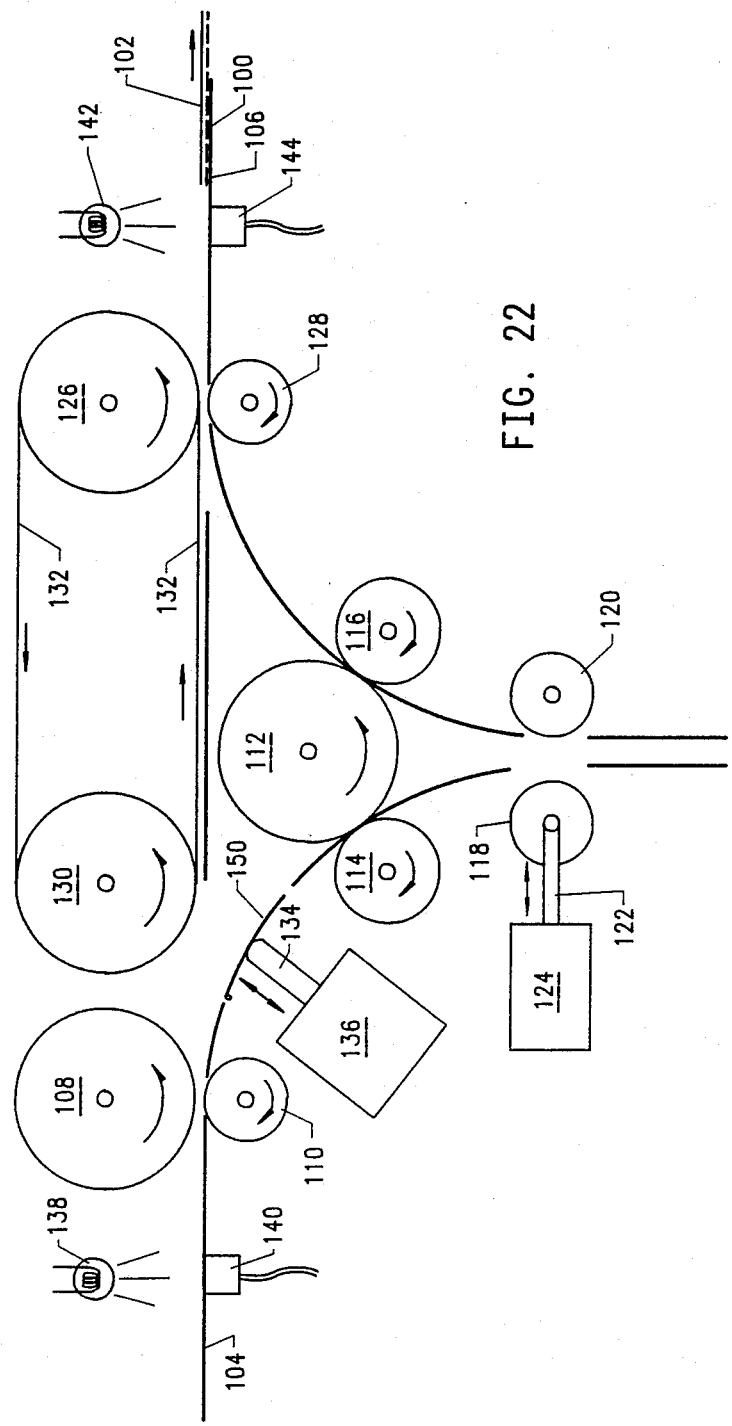

FIG. 22 shows the workpiece leaving the apparatus of the present invention. The photosensor 144 is used to sense that the workpiece has left the apparatus.

FIGS. 23 through 26 show the operation of the apparatus where the workpiece does not get flipped over. In FIG. 23, the workpiece enters the apparatus on input tray 104 as before except that the top of the workpiece 100 is on the bottom and the bottom of the workpiece 102 is on the top. Air cylinder 136 is activated and pin 134 is extended to raise the gate arc 150.

Figure 24:
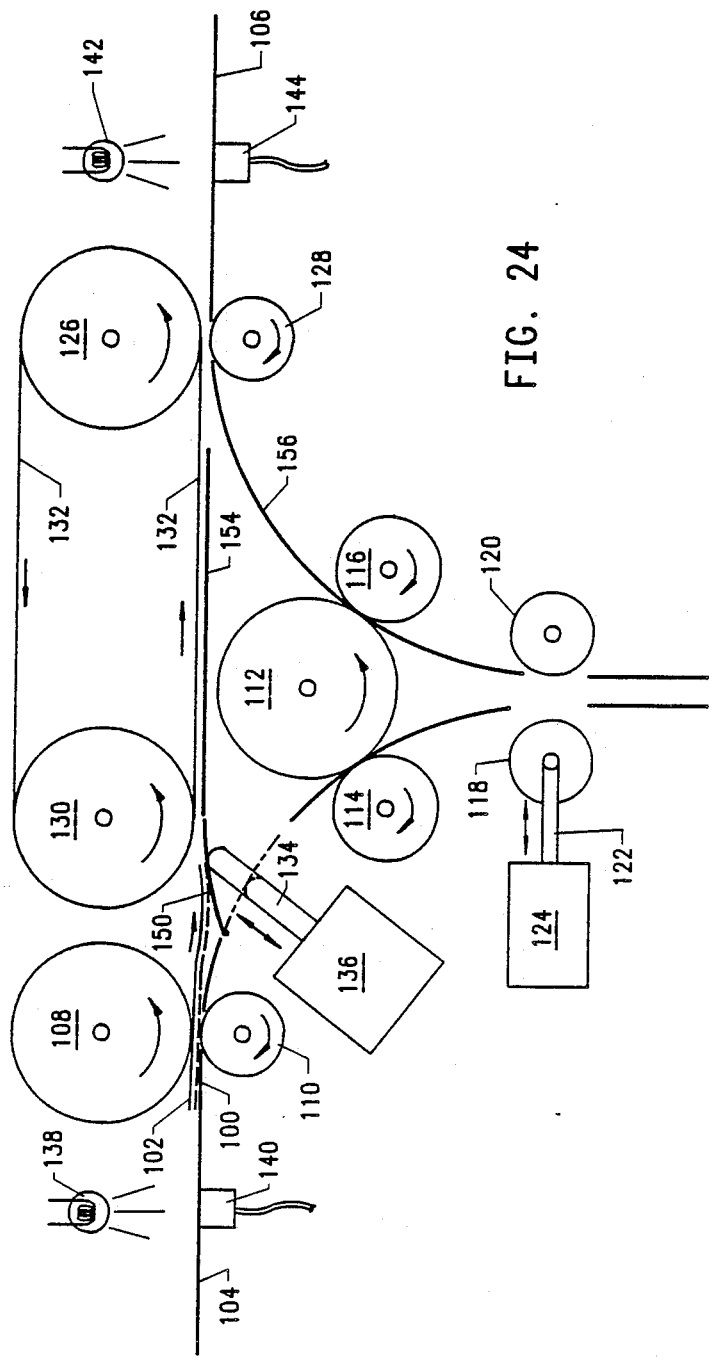

In FIG. 24, the coacting rollers 108 and 110 have gripped the workpiece and propelled it into the apparatus on the fixed curved arc 148 and onto the gate 150 which is in the raised position.

In FIG. 25, the workpiece is in contact with the belt 132. Belt 132 drives the workpiece across the horizontal tray 154 by the belt 132. Rollers 126 and 130 drive the belt 132.

FIG. 26 shows the workpiece being propelled by the coacting rollers 126 and 128 onto upper tray 106. FIG. 22 shows the last figure in this sequence as well. After the workpiece clears the photosensor 144, the air cylinder 136 and pin 134 retract the gate 150 into the flip position in preparation for the next work piece.

An apparatus for flipping over flexible limp planar objects is disclosed. Although the present invention has been shown and described with respect to preferred embodiments, various changes and modifications which, after reading this disclosure, may be apparent to a person skilled in the art to which the invention pertains are deemed to lie within the spirit and scope of the invention.

What is claimed is:

1. An apparatus for inverting a fabric workpiece, said workpiece having a first face and a second face comprising:
   a. means for receiving said workpiece into said apparatus, said workpiece being oriented so as to have leading and trailing edges and with said first face facing up;
   b. a pair of vertically extending, parallel, spaced apart walls which define an inversion slot having an opening at its upper end;
   c. a primary workpiece propeller for drawing said workpiece by its leading edge into said inversion slot and for removing the workpiece from said inversion slot by its trailing edge; and
   d. means for stopping said workpiece at a selected location within said slot such that the trailing edge of the workpiece is in contact with the primary workpiece propeller including means for monitoring the position of the trailing edge of the workpiece relative to the opening of the inversion slot and the primary propeller and for generating a control signal to stop the progress of the workpiece into the inversion slot prior to the point that the trailing edge leaves contact with the primary propeller, whereby the primary workpiece propeller flips over the trailing edge of the workpiece and withdraws the workpiece from the inversion slot by pulling on the trailing edges of the workpiece.

2. An apparatus for inverting a fabric workpiece, said workpiece having a first face and a second face comprising:
   a. means for receiving said workpiece into said apparatus, said workpiece being oriented so as to have leading and trailing edges and with said first face facing up;
   b. a pair of vertically extending, parallel, spaced apart walls which define an inversion slot having an opening at its upper end;
   c. a primary workpiece propeller for drawing said workpiece by its leading edge into said inversion slot and for removing the workpiece from said inversion slot by its trailing edge; and
   d. means for stopping said workpiece at a selected location within said slot such that the trailing edge of the workpiece is in contact with the primary workpiece propeller including pin means having a distal end which is selectively movable between an extended position for stopping the progress of said workpiece into the inversion slot and a retracted position for allowing said workpiece to move in the inversion slot, whereby the primary workpiece propeller flips over the trailing edge of the workpiece and withdraws the workpiece from the inversion slot by pulling on the trailing edges of the workpiece.

3. The apparatus according to claim 2 wherein said pin end has a driven third roller for driving said workpiece upward in said inversion slot in response to a control signal.

4. The apparatus according to claim 1 wherein the upper end of the inversion slot is flared having an input flare and an output flare and further comprising a first roller positioned to contact said primary propeller through the input flare.

5. The apparatus according to claim 1 wherein the upper end of the inversion slot is flared having an input flare and an output flare and further comprising a second roller positioned to contact said primary propeller in the output flare.

6. The apparatus according to claim 1 further comprising means for preventing the apparatus from inverting the workpiece including a gate having an extended position and a retracted position where the extended position blocks the workpiece from entering the inversion slot after it has contacted the primary propeller so that the primary propeller continues to urge the workpiece through the apparatus.

7. An apparatus for selectively inverting a limp workpiece, said workpiece having a top surface, a bottom surface, a leading edge and a trailing edge, said apparatus comprising:
    a. an first roller and second roller, said first and second roller forming a pair of coacting rollers for receiving said workpiece and propelling it downstream;
    b. a first path for inverting said workpiece, said first path having an upstream direction and a downstream direction, comprising:
       (1) a third roller and a fourth roller downstream of said input guide, said third roller in contact with said fourth roller forming thereby a second pair of coacting rollers for receiving said workpiece and propelling downstream;
       (2) a first substantially vertical wall and a second substantially vertical wall in spaced relation to one another forming therebetween an inversion slot downstream of said third and fourth rollers;
       (3) means for stopping said workpiece at a selected location within said slot such that the trailing edge of the workpiece is in contact with the fourth roller, whereby the fourth roller flips over the trailing edge of the workpiece;
       (4) a fifth roller, downstream of said slot and in contact with said fourth roller forming thereby a third pair of coacting rollers for receiving said workpiece and withdrawing it from said slot; and
       (5) a sixth roller and a seventh roller downstream of said third pair of coacting rollers, said sixth roller in contact with said seventh roller forming thereby a fourth pair of coacting rollers for receiving said workpiece and propelling downstream; and
    c. a second path for passing but not inverting said workpiece, said second path having an upstream direction and a downstream direction, comprising:
       (1) a diverter gate positioned downstream of said first pair of coacting rollers and upstream of said second pair of coacting rollers for diverting said workpiece away from said first path;
       (2) a transfer tray for receiving said workpiece from said gate in said non-inverting position; and
       (3) an eighth roller downstream of said gate in said non-inverting position for propelling said workpiece downstream along said transfer tray to said fourth pair of coacting rollers.

8. The apparatus according to claim 7 further comprising a belt surrounding said seventh roller and said eighth roller.

9. The apparatus according to claim 7 wherein said means for stopping comprises means for monitoring the position of the trailing edge of the workpiece relative to the inversion slot and the fourth roller and for generating a control signal to stop the progress of the workpiece into the inversion slot prior to the point that the trailing edge leaves contact with the fourth roller.

10. The apparatus according to claim 7 wherein said means for stopping comprises a ninth and tenth roller, where said tenth roller is movable between an extended position for stopping the progress of said workpiece into the inversion slot and a retracted position for allowing said workpiece to move in the inversion slot.

11. The apparatus according to claim 10 wherein said ninth and tenth rollers are driven in response to said control signal.

* * * * *